United States Patent
Cheung et al.

(10) Patent No.: US 8,506,437 B2
(45) Date of Patent: Aug. 13, 2013

(54) TWO-SPEED DRIVE SYSTEM FOR MOTOR-DRIVEN APPLIANCES

(75) Inventors: Shu Wan Cheung, Quarry Bay (HK);
Shu Sang Cheung, Quarry Bay (HK);
To Yin Pang, Quarry Bay (HK)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 286 days.

(21) Appl. No.: 13/026,063

(22) Filed: Feb. 11, 2011

(65) Prior Publication Data
US 2012/0071293 A1    Mar. 22, 2012

(30) Foreign Application Priority Data
Sep. 21, 2010    (CN) ............ 2010 2 0541765 U

(51) Int. Cl.
*F16H 48/00*    (2006.01)
*F16H 57/08*    (2006.01)
*B60K 3/00*    (2006.01)

(52) U.S. Cl.
USPC ............ 475/12; 475/341; 74/810.1

(58) Field of Classification Search
USPC .......... 475/12, 338, 341, 324; 74/810.1, 74/404, 405, 329, 413, 414, 425
See application file for complete search history.

(56) References Cited

U.S. PATENT DOCUMENTS

| | | | | |
|---|---|---|---|---|
| 3,026,732 A | * | 3/1962 | Corvisier | 74/18 |
| 3,207,005 A | * | 9/1965 | Geyer | 74/810.1 |
| 5,531,651 A | * | 7/1996 | Yang | 475/12 |
| 5,881,609 A | * | 3/1999 | Palmer | 74/810.1 |
| 6,484,608 B1 | * | 11/2002 | Ziavras | 74/810.1 |
| 8,257,220 B2 | * | 9/2012 | Yang | 475/287 |
| 2011/0190085 A1 | * | 8/2011 | Yang | 475/12 |
| 2011/0190087 A1 | * | 8/2011 | Yang | 475/12 |

* cited by examiner

*Primary Examiner* — Roger Pang
(74) *Attorney, Agent, or Firm* — Intellectual Property Law Group LLP

(57) ABSTRACT

There is disclosed a mechanical two-speed drive system/gearbox for household appliances such as a blender or food processor. The gearbox comprises a motor, a motor shaft, a drive-outlet, and the installation of one-way bearings in suitable places in the gear-train. The drive-outlet can be driven at two different speeds in the same rotational direction. By operating the motor in the clockwise direction and counter-clockwise direction, a change in the drive-outlet rpm is achieved. When operating in the hi-speed mode, the drive-outlet is directly driven by the motor. When operating in the lo-speed mode, the drive-outlet is driven via the gear-train, with a resulting increase in torque. This gearbox is simple to construct, and operable without expensive control electronics. In particular applications with electronic motor speed and directional control, a much broader and useable drive-outlet speed range is achieved.

20 Claims, 4 Drawing Sheets

TWO-SPEED DRIVE SYSTEM FOR MOTOR-DRIVEN APPLIANCES

CROSS-REFERENCE TO RELATED APPLICATION

This application claims benefit of China patent application no. 201020541765.3, filed on Sep. 21, 2010, the disclosure of which is hereby incorporated by reference in its entirety for all purposes.

BACKGROUND OF THE INVENTION

1. Field of Invention

The present invention relates to a drive system for motor-driven household appliances. In particular, the invention relates to a two-speed drive system or gearbox for an appliance in which a drive-outlet is driven at two different speeds in a same rotational direction.

2. Background

In traditional household appliances such as juice extractors, blenders, meal makers, stir cookers, food processors, soymilk makers and soup makers, etc., a common construction includes a motor which is fixed in a unit base, the motor shaft is mounted with a coupling, the blade or tools are directly assembled to the drive outlet, the motor is rotating at a speed that directly drives the blade or tools to process the foods. As different foods need different processing speeds, traditional household appliances have a speed adjusting switch, but its speed is changed by variable voltage. Although this saves energy, it is very low in reliability, the output torque is decreased, the speed is not stable, and it can only process soft foods. Harder foods are very difficult to process, aggravating and damaging the motor as well as the blade or tools of the appliance.

Also, market household appliances are set with different drive outlets that can be connected with different sizes of a blade or tools. Each drive outlet has its different speed to process the food. To process different kinds of foods, the blades or tools need to be changed and connected with the particular drive outlet. During the procedure of blade or tool change, the appliance unit needs to be stopped, thereby making it both inconvenient and a waste of time. In addition, when processing hot foods, changing the blades or tools is both difficult and un-safe.

Therefore, there is a need for an invention concerning a household appliance with a two-speed drive system in which a drive-outlet can be driven at two different speeds in the same rotational direction, where this two-speed drive system cooperates with one-way bearings and a gear system without changing the input voltage. There is a need for such an invention which is further simple in construction, reliable, stable with high torque, convenient to use, and able to process various foods.

SUMMARY OF THE INVENTION

It is therefore an object of the invention to provide a household appliance with a two-speed drive system which a drive-outlet can be driven at two different speeds in a same rotational direction.

It is therefore another object of the invention to provide a motor which drives a drive-outlet and rotates in a clockwise and counterclockwise direction through one-way bearings and a gear down system to provide two different speed drives.

It is therefore another object of the invention to provide this two-speed drive system while incorporating the use of three, one-way bearings and a gear system and without changing the input voltage.

It is therefore a further object of the invention to provide a drive-outlet with two different speeds drives, the first speed being directly driven with the motor, the second speed being driven with a gear down system that is according to gear ratio.

Accordingly, there is provided a two-speed drive system having three one-way bearings, wherein the installation of one-way bearings is in suitable places within the gear-train. The one-way bearings serve as directional couplings, which means that the driving member rotates the driven member in one direction, while automatically disengaging itself from the driven member when the direction of rotation is reversed. The gear down system can use a worm gear system, planetary gear system and other types of gear systems.

In applications where the drive outlet is required to rotate in a clockwise/counter-clockwise direction in the hi/lo speed mode, additional gearings can be inserted in the gearbox to achieve this requirement.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Figure 1:
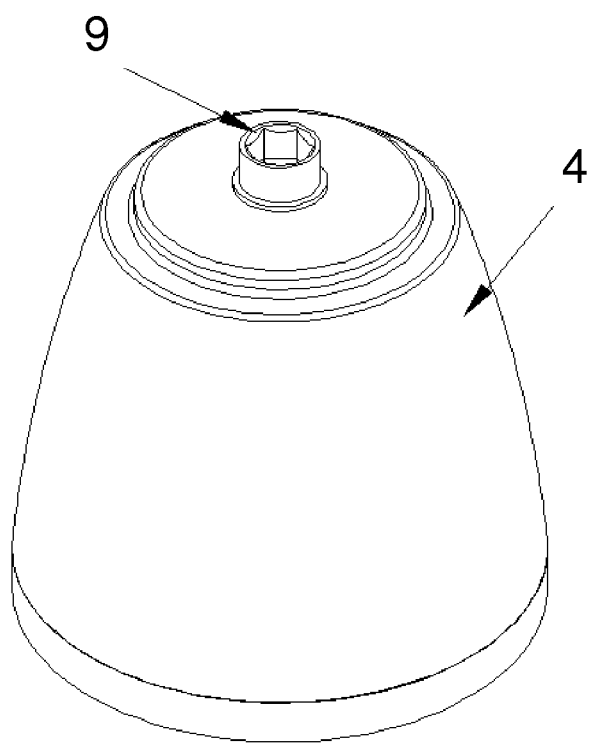
FIG. 1 is a perspective view of a base of the two-speed drive system for an appliance, according to an embodiment of the present invention.

Referring to FIG. 1. FIG. 2, FIG. 3, FIG. 4, and FIG. 5, the two-speed drive system for household appliances according to an embodiment of the present invention, comprises a motor 1 and a motor shaft 2 which are installed in a support bracket 3. The support bracket 3 is installed inside a base 4 of household appliances, and within the middle of the motor shaft 2 there is installed a first one-way bearing 5. At the end of motor shaft 2 there is installed a second one-way bearing 6. A drive-shaft 7 is mounted on the second one-way bearing 6, and within the middle of the drive-shaft 7 there is installed a third one-way bearing 8 and a drive gear 10 which is installed on the third one-way bearing 8, and further at the end of the drive-shaft 7 there is installed a drive-outlet 9.

Figure 6A:
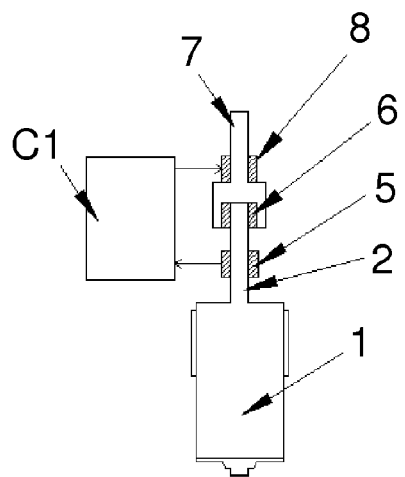
FIGS. 6a, 6b and 6c illustrate the principle of a two-speed drive system, according to an embodiment of the present invention.
Figures 6B, 6C:
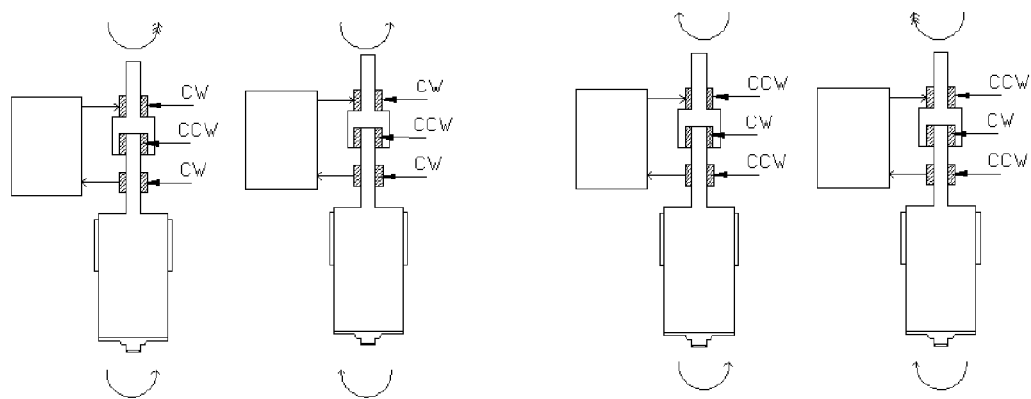

As illustrated in FIG. 6a, FIG. 6b, FIG. 6c, the principle of the two-speed drive system is shown in which the first one-way bearing 5 and the third one-way bearing 8 are set in one drive direction; the second one-way bearing 6 is set in an opposite drive direction. The first one-way bearing 5 and the third one-way bearing 8 are driven via the gear down system C1.

In FIG. 6b, the first one-way bearing 5 and the third one-way bearing 8 are set in clockwise drive direction (CW) in view from the top, the second one-way bearing 6 is set in counter-clockwise drive direction (CCW). While the motor 1 is driven in the counter-clockwise direction, the first one-way bearing 5 and the third one-way bearing 8 are disengaged, the second one-way bearing 6 is engaged with the motor shaft 2 and directly drives the drive-shaft 7 at a high speed in the counter-clockwise direction. While the motor 1 is driven in the clockwise direction, the second one-way bearing 6 is disengaged, the first one-way bearing 5 and the third one-way bearing 8 are engaged with the motor shaft 2 and driven via the gear down system C1 to the drive-shaft 7 at low speed in the counter-clockwise direction.

In FIG. 6c, the first one-way bearing 5 and the third one-way bearing 8 are set in the counter-clockwise drive direction (CCW) in view from the top, the second one-way bearing 6 is set in clockwise drive direction (CW). While the motor 1 is driven in the counter-clockwise direction, the second one-way bearing 6 is disengaged, the first one-way bearing 5 and the third one-way bearing 8 are engaged with the motor shaft 2 and driven via the gear down system C1 to the drive-shaft 7 at low speed in the clockwise direction. While the motor 1 is driven in clockwise direction, the first one-way bearing 5 and the third one-way bearing 8 are disengaged, the second one-way bearing 6 is engaged with motor shaft 2 and driven via the gear down system C1 to the drive-shaft 7 at high speed in the clockwise direction.

Figure 2:
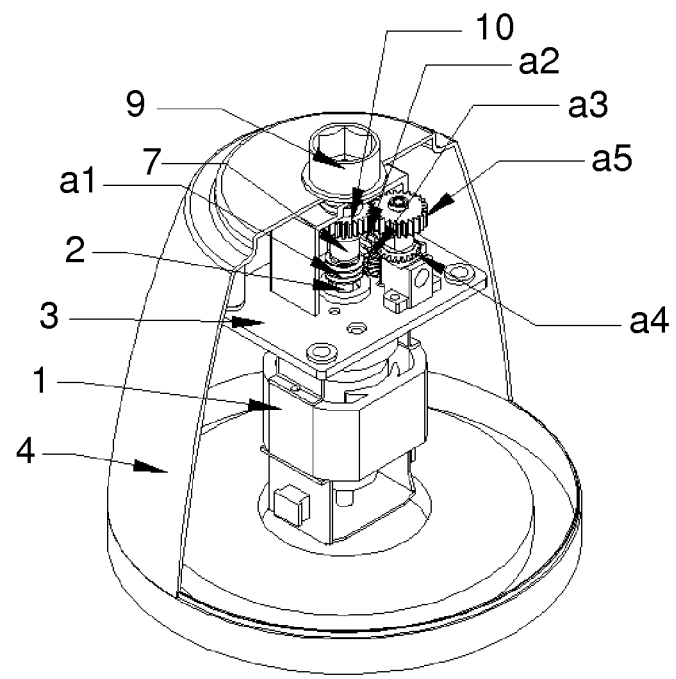
FIG. 2 is a perspective view of the internal components of the two-speed drive system of FIG. 1 with a worm gear down system, with a cross section through the base housing, according to an embodiment of the present invention.
Figure 3:
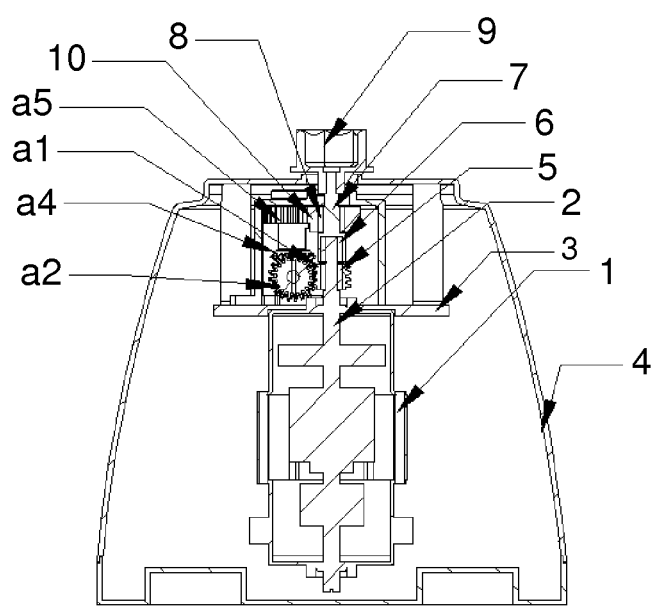
FIG. 3 is cross-sectional view of two-speed drive system of FIG. 2.

Referring to FIG. 2 and FIG. 3, there is shown a worm gear down system with the two-speed drive system; the first one-way bearing 5 is installed with a worm (a1) which connects/meshes with and drives a worm gear (a2); another side of the worm gear (a2) is set with a first bevel gear (a3) which connects with and drives a second bevel gear (a4); the top of the second bevel gear (a4) is set with a gear (a5) (also referred to herein as a top gear), which connects with and drives the drive gear 10; the drive gear 10, which is installed on the third one-way bearing 8, drives both the drive-shaft 7 and the drive-outlet 9.

Figure 4:
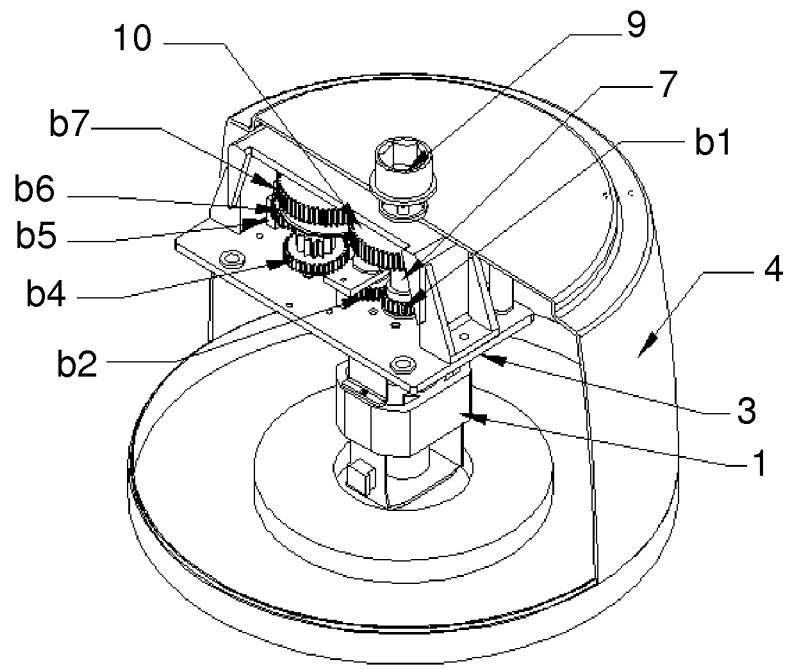
FIG. 4 is a perspective view of the internal components of the two-speed drive system of FIG. 1 with a with a planetary gear down system, with a cross section through the base housing, according to an embodiment of the present invention.
Figure 5:
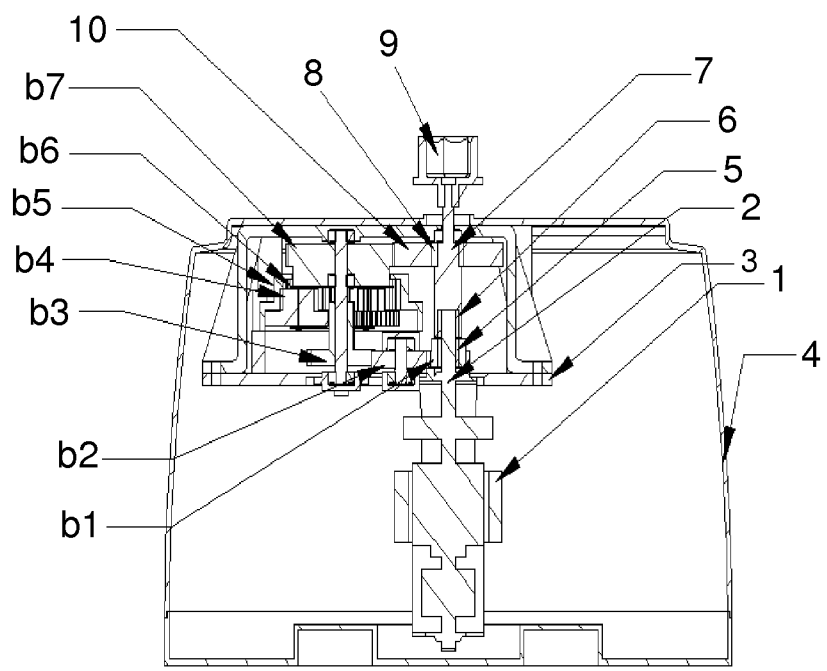
FIG. 5 is cross-sectional view of two-speed drive system of FIG. 4.

Referring to FIG. 4 and FIG. 5, there is shown a planetary gear down system with the two-speed drive system; the first one-way bearing 5 is installed with a first gear (b1) which connects/meshes with and drives a second gear (b2); the second gear (b2) connects with and drives a sun gear (b3); the sun gear (b3) drives a set of planet gears (b4). The set of planet gears (b4) is fixed with an arm (b6) which runs within a ring gear (b5). A third gear (b7) is installed on the arm (b6) (the third gear also referred to herein as a top gear). The third gear (b7) connects with and drives the drive gear 10, the drive gear 10, which is installed on the third one-way bearing 8, drives both the drive-shaft 7 and the drive-outlet 9.

The gear down system can be used with a worm gear down system, planetary gear down system and other types of gear systems.

The figures serve to illustrate the invention, and should not be construed as limiting the scope of the invention. It is understood that the present disclosure of the preferred form can be changed in the details of assembly and parts without departing from the spirit and scope of the invention. Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

We claim:

1. A two-speed drive system for household appliances comprising:
    a motor and a motor shaft installed and coupled to a support bracket, wherein the support bracket is mounted in a base of a household appliance;
    a first one-way bearing installed at a middle section of the motor shaft;
    a second one-way bearing installed at an upper end section of the motor shaft;
    a drive-shaft mounted on the second one-way bearing;
    a third one-way bearing installed at a middle section of the drive-shaft;
    a drive gear installed on the third one-way bearing; and
    a drive outlet installed at an upper end of the drive-shaft;
    wherein the first one-way bearing is arranged with a first gear that is connected with and drives a gear down system; and at a top of the gear down system there is an installed a top gear which drives the drive gear of the drive-shaft and the drive-outlet.

2. A two-speed drive system for household appliances according to claim 1, wherein the gear down system is a worm gear down system.

3. A two-speed drive system for household appliances according to claim 1, wherein the gear down system is a planetary gear down system.

4. A two-speed drive system for household appliances according to any one of claim 1, wherein the first one-way bearing and the third one-way bearing are each set in one drive direction; the second one-way bearing is set in opposite drive direction; and the first one-way bearing and the third one-way bearing are each driven via the gear down system.

5. A two-speed drive system for household appliances according to any one of claim 2, wherein the first one-way bearing and the third one-way bearing are each set in one drive direction; the second one-way bearing is set in opposite drive direction; and the first one-way bearing and the third one-way bearing are each driven via the worm gear down system.

6. A two-speed drive system for household appliances according to any one of claim 3, wherein the first one-way bearing and the third one-way bearing are each set in one drive direction; the second one-way bearing is set in opposite drive direction; and the first one-way bearing and the third one-way bearing are each driven via the planetary gear down system.

7. A two-speed drive system for household appliances according to claim 4, wherein the first one-way bearing and the third one-way bearing are each set in clockwise drive direction (CW) when viewed from the top; the second one-way bearing is set in counter-clockwise drive direction (CCW); and when the motor is driven in counter-clockwise direction, the drive-shaft is driven at a high speed in counter-clockwise direction; when the motor is driven in clockwise direction, the drive-shaft is driven at a low speed in counter-clockwise direction.

8. A two-speed drive system for household appliances according to claim 5, wherein the first one-way bearing and the third one-way bearing are each set in clockwise drive direction (CW) when viewed from the top; the second one-way bearing is set in counter-clockwise drive direction (CCW); and when the motor is driven in counter-clockwise direction, the drive-shaft is driven at a high speed in counter-clockwise direction; when the motor is driven in clockwise direction, the drive-shaft is driven at a low speed in counter-clockwise direction.

9. A two-speed drive system for household appliances according to claim 6, wherein the first one-way bearing and the third one-way bearing are each set in clockwise drive direction (CW) when viewed from the top; the second one-way bearing is set in counter-clockwise drive direction (CCW); and when the motor is driven in counter-clockwise direction, the drive-shaft is driven at a high speed in counter-clockwise direction; when the motor is driven in clockwise direction, the drive-shaft is driven at a low speed in counter-clockwise direction.

10. A two-speed drive system for household appliances according to claim 4, wherein the first one-way bearing and the third one-way bearing are each set in counter-clockwise drive direction (CCW) when viewed from the top, the second one-way bearing is set in clockwise drive direction (CW); and when the motor is driven in counter-clockwise direction, the drive-shaft is driven at a low speed in clockwise direction; when the motor is driven in clockwise direction, the drive-shaft is driven at high speed in clockwise direction.

11. A two-speed drive system for household appliances according to claim 5, wherein the first one-way bearing and the third one-way bearing are each set in counter-clockwise drive direction (CCW) when viewed from the top, the second one-way bearing is set in clockwise drive direction (CW); and when the motor is driven in counter-clockwise direction, the drive-shaft is driven at a low speed in clockwise direction; when the motor is driven in clockwise direction, the drive-shaft is driven at high speed in clockwise direction.

12. A two-speed drive system for household appliances according to claim 6, wherein the first one-way bearing and the third one-way bearing are each set in counter-clockwise drive direction (CCW) when viewed from the top, the second one-way bearing is set in clockwise drive direction (CW); and when the motor is driven in counter-clockwise direction, the drive-shaft is driven at a low speed in clockwise direction; when the motor is driven in clockwise direction, the drive-shaft is driven at high speed in clockwise direction.

13. A two-speed drive system for household appliances according to claim 2, wherein the first gear is a worm which is arranged with the first one-way bearing, the worm is connected to and drives the worm gear down system; the worm gear down system comprising a worm gear connected with and driven by the worm;

a first bevel gear set with another side of the worm gear, the first bevel gear connects with and drives a second bevel gear; and a top of the second bevel gear is set with the top gear which connects with and drives the drive gear of the third one-way bearing.

14. A two-speed drive system for household appliances according to claim 3, wherein the first one-way bearing that is arranged with the first gear is connected with and drives the planetary gear down system, the planetary gear down system comprising a second gear connected with and driven by the first gear;

a sun gear connect with and driven by the second gear;

a set of planet gear driven by the sun gear;

an arm installed with the set of planet gear which runs inside a ring gear;

wherein the top gear is installed on the arm; and the top gear connects with and drives the drive gear of the third one-way bearing.

15. A two-speed drive system for household appliances according to claim 13, wherein the first one-way bearing and the third one-way bearing are each set in one drive direction; the second one-way bearing is set in opposite drive direction; and the first one-way bearing and the third one-way bearing are each driven via the worm gear down system.

16. A two-speed drive system for household appliances according to claim 14, wherein the first one-way bearing and the third one-way bearing are each set in one drive direction; the second one-way bearing is set in opposite drive direction; and the first one-way bearing and the third one-way bearing are each driven via the planetary gear down system.

17. A two-speed drive system for household appliances according to claim 15, wherein the first one-way bearing and the third one-way bearing are each set in clockwise drive direction (CW) when viewed from the top; the second one-way bearing is set in counter-clockwise drive direction (CCW); and when the motor is driven in counter-clockwise direction, the drive-shaft is driven at a high speed in counter-clockwise direction; when the motor is driven in clockwise direction, the drive-shaft is driven at a low speed in counter-clockwise direction.

18. A two-speed drive system for household appliances according to claim 16, wherein the first one-way bearing and the third one-way bearing are each set in clockwise drive direction (CW) when viewed from the top; the second one-way bearing is set in counter-clockwise drive direction (CCW); and when the motor is driven in counter-clockwise direction, the drive-shaft is driven at a high speed in counter-clockwise direction; when the motor is driven in clockwise direction, the drive-shaft is driven at a low speed in counter-clockwise direction.

19. A two-speed drive system for household appliances according to claim 15, wherein the first one-way bearing and the third one-way bearing are each set in counter-clockwise drive direction (CCW) when viewed from the top, the second one-way bearing is set in clockwise drive direction (CW); and when the motor is driven in counter-clockwise direction, the drive-shaft is driven at a low speed in clockwise direction; when the motor is driven in clockwise direction, the drive-shaft is driven at high speed in clockwise direction.

20. A two-speed drive system for household appliances according to claim 16, wherein the first one-way bearing and the third one-way bearing are each set in counter-clockwise drive direction (CCW) when viewed from the top, the second one-way bearing is set in clockwise drive direction (CW); and when the motor is driven in counter-clockwise direction, the drive-shaft is driven at a low speed in clockwise direction; when the motor is driven in clockwise direction, the driveshaft is driven at high speed in clockwise direction.

* * * * *